Sept. 24, 1940.   C. E. SMITH   2,215,840
TIRE CHAIN
Filed Feb. 26, 1940   2 Sheets-Sheet 1

Charles E. Smith,
INVENTOR
BY Victor J. Evans & Co.
ATTORNEYS

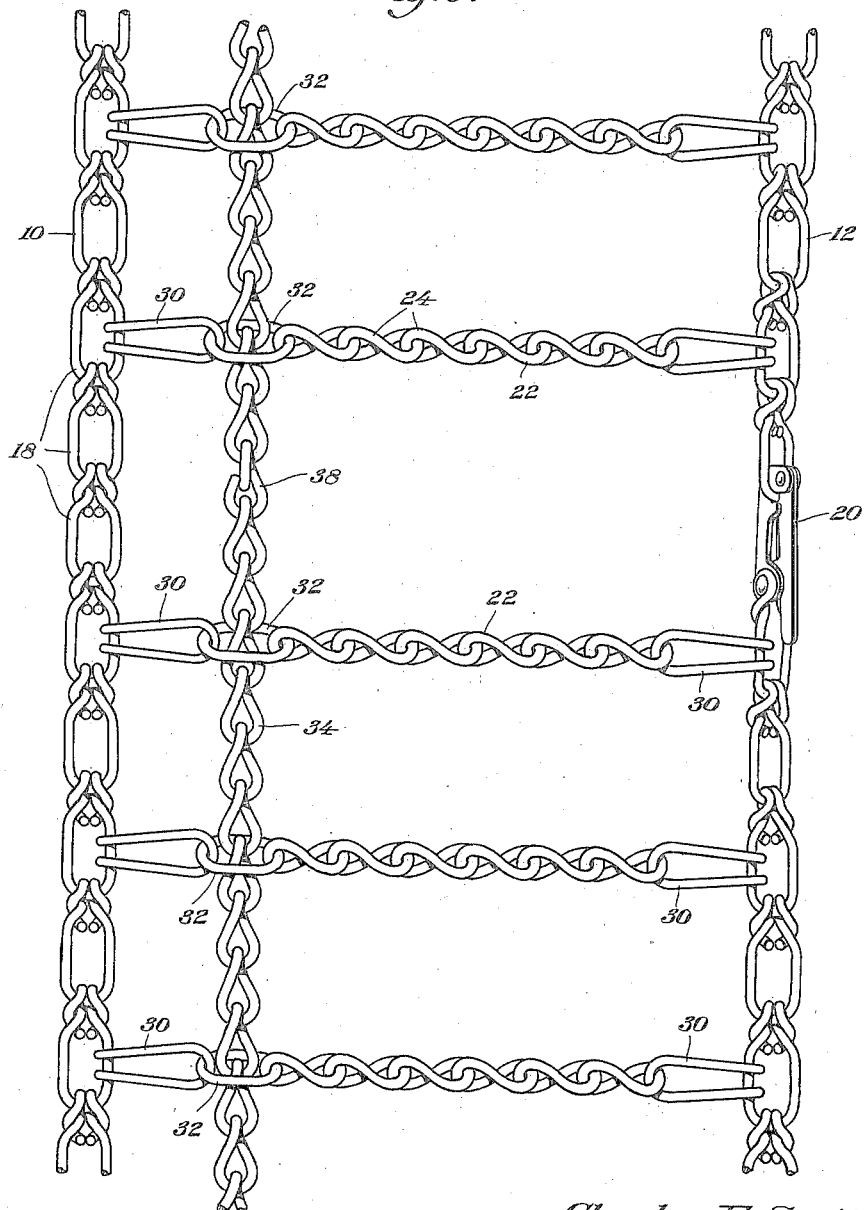

Patented Sept. 24, 1940

2,215,840

UNITED STATES PATENT OFFICE 2,215,840

TIRE CHAIN

Charles E. Smith, Fairmont, W. Va.

Application February 26, 1940, Serial No. 320,913

3 Claims. (Cl. 152—240)

My invention relates to automobile tire chains, and has among its objects and advantages the provision of an improved chain designed to effectively restrain the vehicle from lateral skidding.

In the accompanying drawings:

Figure 3 is a plan view of a section of the tire chain.

Figure 1:
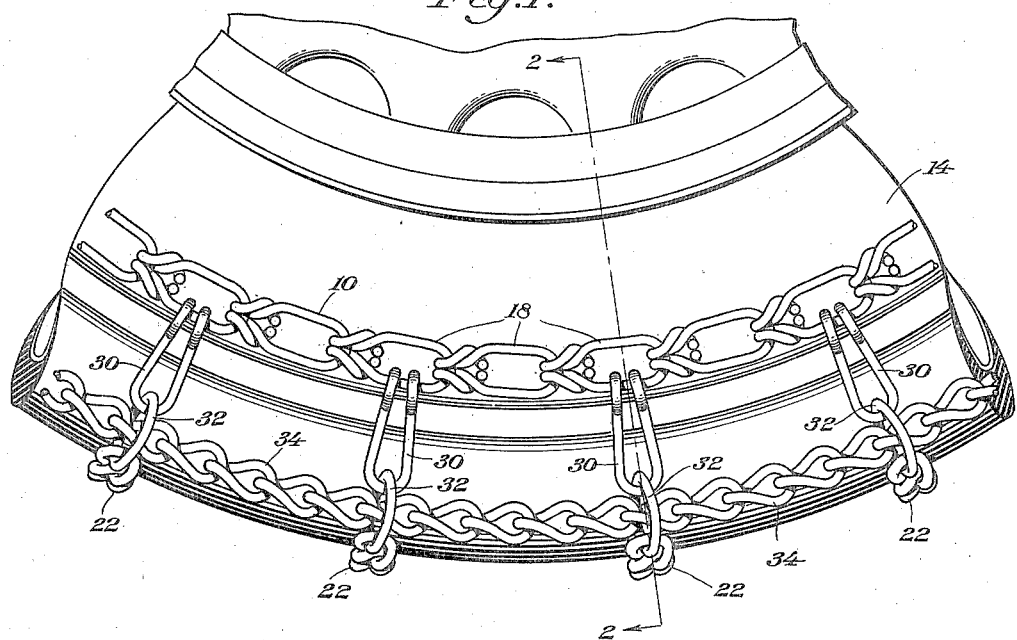
Figure 1 is an elevational view of a portion of an automobile tire illustrating my invention applied thereto.

In the embodiment selected to illustrate my invention, the chain includes parallel side members 10 and 12 which extend circumferentially about the tire 14 adjacent its side walls 16. Members 10 and 12 are made up of chain links 18, and the member 10 is endless while the member 12 is provided with a conventional connector 20 so that this member may be opened to permit mounting of the tire chain on the tire. Member 12 lies adjacent the inner side wall of the tire.

Members 10 and 12 function as mounts or retainers for a series of tread members 22 which are arranged at right angles to the members 10 and 12. Tread members 22 are made up of chain links 24 and are flexible so as to conform to the curvature of the face 26 of the tire tread body 28, see Fig. 2. Tread members 22 are of relatively hard material for wear resisting purposes, and the ends of the members are connected with the members 10 and 12 through the medium of links 30 of softer material so that the links may be bent to opened positions to facilitate assembly of the chain parts as well as repair in cases where the tread members 22 become worn. Tread members 22 are of such lengths as to bring the softer links 30 considerable distances inwardly of the tread body 28 so as to position the softer links in the clear of the road surface.

Each of the tread members 22, which members supply traction and effectively prevent longitudinal skidding, is provided with an enlarged link 32 through which an antiskidding member 34 is loosely threaded. Links 32 are also tempered for wear resisting purposes. Member 34 is of the chain type and lies adjacent the outer wall face 36 of the tread body 28. Member 34 is also tempered for wear resisting purposes.

Figure 2:
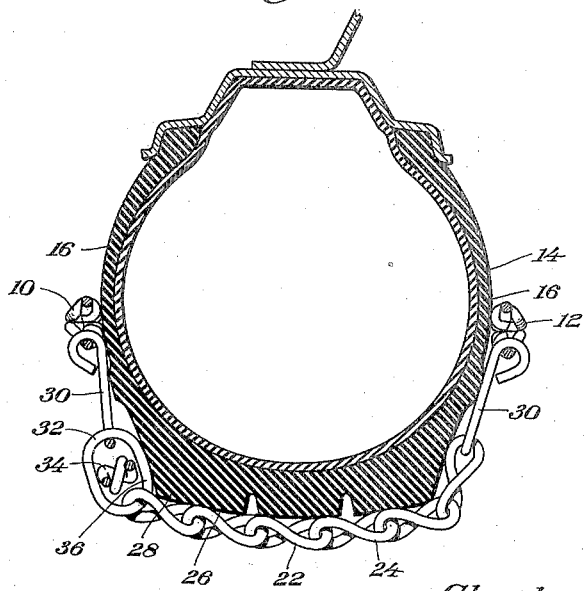
Figure 2 is a sectional view along the line 2—2 of Figure 1.

Fig. 2 illustrates the tire chain applied to the tire, and under normal running conditions the member 34 carries no load, since it is positioned in the clear of the load bearing area of the tread body. In the event of lateral skidding, the tire chain as a whole is shifted laterally of the tire and brings the member 34 into play. While lateral skidding may shift the tire chain as a whole in one direction or the other, each wheel of the vehicle carries an identical chain so that at least one or both of the members 34 on one side of the vehicle are shifted underneath the face 26 into engagement with the roadbed to prevent further lateral skidding of the vehicle. In other words, lateral skidding of the vehicle loops certain of the members 34 inwardly of the faces 26 of the tread body so as to be effectively brought into vehicle load carrying positions.

Links 32 loosely receive the member 34 so that the latter serves no retaining function with respect to the tread members 22. In the event that one of the tread members 22 becomes damaged and requires substitution of a new tread member, member 34 is supplied with a soft link 38 which may be moved in the vicinity of the damaged tread link through shifting of the member 34 relatively to the links 32. Link 38 is then opened which permits the damaged tread member 22 to be disconnected at its links 30. Accordingly, the chain may be repaired without necessitating complete disassembly thereof.

Having thus described certain embodiments of my invention in detail, it is, of course, understood that I do not desire to limit the scope thereof to the exact details set forth except insofar as those details may be defined in the appended claims.

I claim:

1. A tire chain comprising parallel side members, one of said side members being open and having a connector means for connecting the ends thereof after positioning of the chain on the tire, transverse tread members connected with said side members, an eye in each of said transverse tread members, and an endless tread member extending loosely through said eyes and normally lying to one side of the load bearing face of the tire tread, but arranged to loop inwardly across the tire tread when the tire skids laterally.

2. A tire chain comprising parallel side members, one of said side members being open and having a connector means for connecting the ends thereof after positioning of the chain on the tire, transverse tread members connected with said side members, an eye in each of said transverse tread members, an endless tread member extending loosely through said eyes and normally lying to one side of the load bearing face of the tire tread, but arranged to loop inwardly across the tire tread when the tire skids laterally, said endless tread member being manually shiftable through said eyes, and a separable link in said endless tread member arranged to be shifted into the vicinity of preselected transverse tread members through shifting of the endless tread member relatively to said eyes.

3. A tire chain comprising parallel side members, one of said side members being endless and the other side member being open and having a connector means for connecting the ends thereof after positioning of the chain on the tire, transverse tread members connected with said side members, an eye link in each side of said transverse tread members, said eye links being aligned circumferentially of the tire and located to one side of the load bearing face of the tire tread, and an endless tread member extending loosely through said eye links to be looped inwardly across the face of the tire tread when one or more of said transverse tread members are shifted longitudinally in a predetermined direction relatively to the tire tread.

CHARLES E. SMITH.